June 23, 1970 B. R. SNOOK 3,516,234
ROTARY MOWERS
Filed May 27, 1968
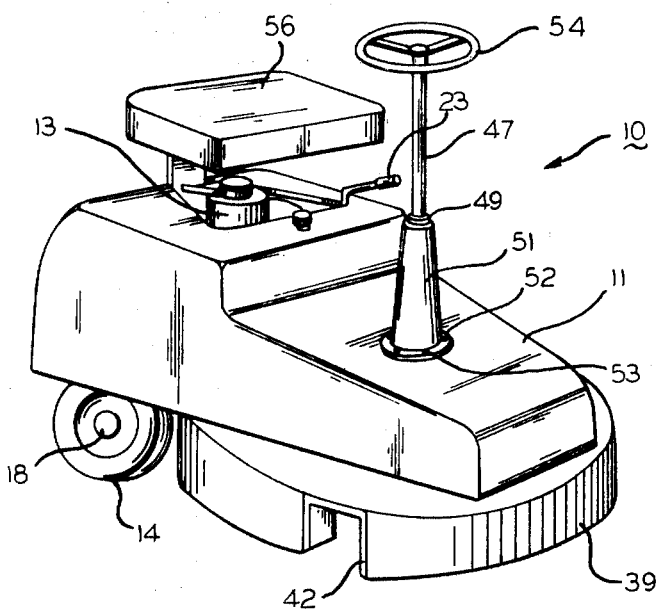
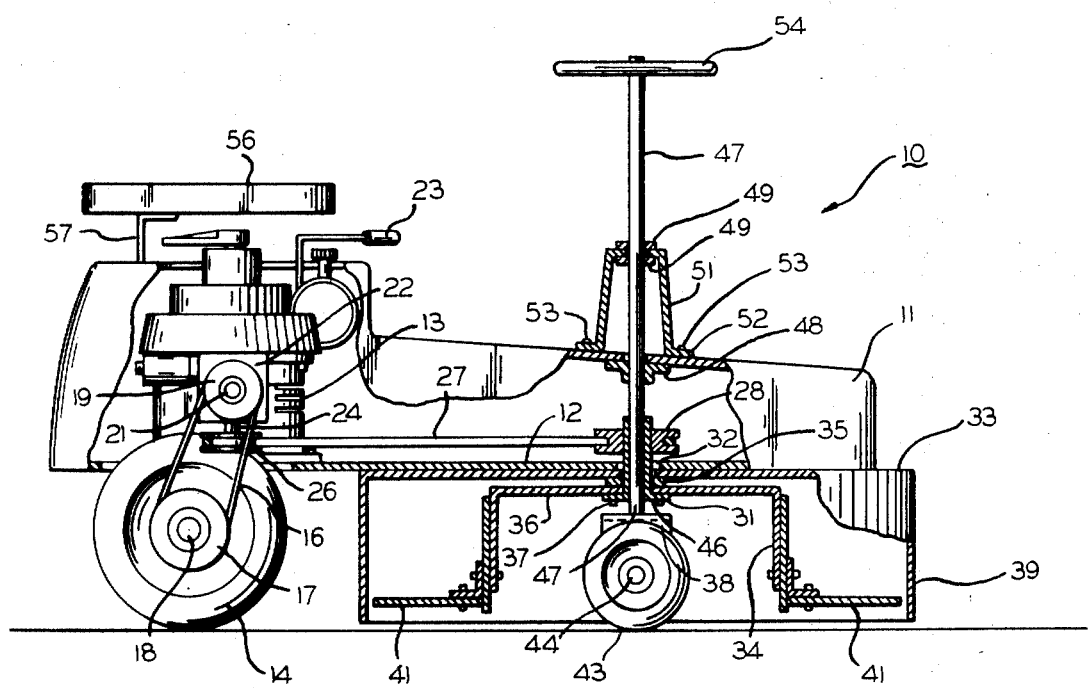
INVENTOR
BROOKSY RAY SNOOK
BY *Richard C. Lindberg*
ATTORNEY 3,516,234
ROTARY MOWERS
Brooksy Ray Snook, 907 N. State St.,
Westville, Ill. 61832
Filed May 27, 1968, Ser. No. 732,172
Int. Cl. A01d 35/26
U.S. Cl. 56—25.4        3 Claims

ABSTRACT OF THE DISCLOSURE

A rotary mower characterized by a frame and a drive motor, driving wheels secured to said frame for driving said mower in forward and reverse directions as desired, a rotary blade shroud enclosing a blade rotor driven from said drive motor, with at least one ground engaging wheel supported on a swivelable frame having a turning center corresponding to the turning center for the blade rotor, steering mechanism disposed on the turning center of said swivelable frame and connected to said swivelable frame for steering said ground engaging wheel whereby the blades of the rotor can cut closely to shrubs and trees, obstructions, lawn edges or the like, and whereby the mower can be steered readily in any direction.

---

The conventional rotary type (as contrasted to reel-type) lawn mowers are generally characterized by front and rear laterally spaced ground engaging wheels fixed in position to corners of a frame or shroud. Such mowers are more often powered by internal combustion engines having a vertical output shaft with the rotor fixed to the shaft within the shroud. The ground engaging wheels, being fixed to the frame, and extending outward therefrom, prevent the mower from operating close to trees, shrubs or other obstructions. Also, by reason of the fact that the wheels are fixed to the frame, the mower cannot be turned readily. Generally to effect turning, the frame must be rocked about its rear wheels, and then turned while the rotor blades are out of contact with the gases.

The mower according to the present invention, on the other hand, is provided with a pair of drive wheels at one end of the rotor shroud, and adapted to be driven as desired in forward and reverse direction by a prime mover mounted on the rotor shroud, at least one other supporting wheel being mounted on a frame freely swivelable on the vertical power shaft for the blade rotor. The frame supporting the front swivelable wheel is connected to steering means nesting within the vertical power shaft and terminating above the rotor shroud for engagement by an operator seated above the prime mover on a seat provided for such operator.

With the foregoing considerations in mind it is a principal object of this invention to provide an improved rotary type mower characterized by ease of turning, mowing closely to trees, shrubs and other obstructions in the grass area.

In the drawing:
FIG. 1 is a perspective view of a rotary mower having the improvements according to the present invention embodied therein; and FIG. 2 is a longitudinal vertical sectional view showing details of a shroud for the rotor blades, a pair of front support wheels mounted to swivel on a center corresponding to the center of rotation of the rotor blades and steering means for such front support wheels, certain parts being shown in elevation.

Referring now to FIG. 1 the improved rotary mower according to the present invention is denoted by the reference numeral 10, and consists of an essentially trapezoidal shaped shroud 11 resting upon a frame 12. The latter supports a prime mover 13 adapted to power rear wheels 14 through the medium of a driving belt or chain 16 trained about a pulley or sprocket 17 fast on an axle 18 having the rear wheels 14 fast thereto, and a pulley or sprocket 19 fast on a power take-off shaft 21 from the prime mover 13. The power take-off shaft 21 is part of a reversing mechanism 22 under the control of a control handle 23 to select forward or reverse drive of the mower 10.

The prime mover 13 has a vertical power take-off shaft 24 with a pulley 26 fast thereon. A drive belt 27 is trained between pulley 26 and a pulley 28 fast on a drive bearing 29 having a lower flange 31 thereon. Drive bearing 29 turns within a bushing 32 fixed within aligned openings in the frame 12 and a shroud 33 for a blade rotor 34 having a hub 36 fixed by cap screws 37 to a lower flange 38 of the drive bearing 29. Bushing 32 has a flange 35 against which the hub 36 bears.

Shroud 33 has a depending flange 39 concealing cutting blades 41 secured to blade rotor 34 in any convenient fashion. Cuttings from the operation of the blade rotor 34 are discharged through an opening 42 in flange 39 of shroud 33.

Structure is provided for maintaining the blades 41 in proper spaced relationship to the ground to achieve proper cutting of the grass, and to provide steering of the mower 10 in directions as desired. Such steering of mower 10 is done by steering wheels wholly concealed within the shroud 34 and swivelable with a frame mounted for swiveling movement upon a center coincident with the center of rotation of the blade rotor 34. By reason of such construction the mower 10 can operate closely to trees and shrubs, and can also operate to trim the edges of a grass plot without scalping of the grass at such edge.

To this end a pair of laterally spaced ground engaging wheels 43 are mounted on stub axles 44 extending laterally from a frame 46. A steering shaft 47 is secured at its lower end to the center of the frame 46 and is nested within the drive bearing 29 to turn freely with respect thereto. Steering shaft 47 is additionally supported in a gland 48 secured to the underside of the shroud 11 and in spaced bushings 49 secured to a steering post 51 having a lower flange 52. Cap screws 53 threaded into the shroud 11 secure the steering post 51 to shroud 11.

The upper end of steering shaft 47 has a steering wheel 54 fixed thereto, and adapted to be turned by an operator (not shown) seated upon a driver's seat 56 mounted upon a bracket 57 secured to the shroud 11 in any convenient manner.

By reason of placing the steering wheels 43 within the orbit of the cutter blades 41, the mower 10 is very compact, and can be operated very close to trees, shrubs, also to the edges of a grass plot without scalping. Also by reason of the closer placement of the steering wheels 43 to the driving wheels 14, the mower can follow undulations in the terrain and give a uniform appearance to the grass when cut.

Also by reason of the placement of the wheels 43, the grass is first cut by the blade rotor 34 and there is no tendency for the grass to be matted down by wheels contacting the grass in advance of the blade rotor.

While the invention has been described in terms of a preferred embodiment thereof, its scope is not intended to be limited by the precise embodiment herein shown nor otherwise than by the terms of the claims here appended.

I claim:
1. In a rotary mower, a frame having a pair of laterally spaced ground engaging drive wheels secured thereto, a prime mover secured to said frame and having power take-off means for driving said drive wheels, a power take-off from said prime mover and connected to a verti- cal power shaft supported by said frame, a blade rotor secured to said power shaft, a shroud for enclosing said blade rotor and having a discharge opening therefrom, means for supporting said blade rotor in proper position with respect to grass being cut and for steering said mower comprising at least one ground engaging wheel mounted for swiveling movement on a center corresponding to the turning center of said blade rotor.

2. A rotary mower according to claim 1 wherein said blade rotor is mounted on hollow bearing means supported in said frame, and wherein said steering means includes a steering shaft connected to said ground engaging wheel and turning within said hollow bearing means.

3. A rotary mower according to claim 2 wherein said swivelable ground engaging means comprises a pair of ground engaging wheels mounted on a frame secured to the lower end of said steering shaft.

References Cited
UNITED STATES PATENTS

| | | | |
|---|---|---|---|
| 2,860,474 | 11/1958 | Cyr | 56—25.4 |
| 2,924,928 | 2/1960 | Rhoades et al. | 56—25.4 |
| 3,008,282 | 11/1961 | Brownlee et al. | 56—25.4 |
| 3,112,594 | 12/1963 | Hallenbeck | 56—25.4 |

RUSSELL R. KINSEY, Primary Examiner